United States Patent [19]

Fischbeck, et al.

[11] 4,201,995
[45] May 6, 1980

[54] COINCIDENCE GATE INK JET WITH INCREASED OPERATING PRESSURE WINDOW

[75] Inventors: Kenneth H. Fischbeck, Dallas; Ganesh L. Harpavat, Plano, both of Tex.

[73] Assignee: Xerox Corporation, Stamford, Conn.

[21] Appl. No.: 966,436

[22] Filed: Dec. 4, 1978

[51] Int. Cl.² .......................................... G01D 15/18
[52] U.S. Cl. .............................................. 346/140 R
[58] Field of Search ............................. 346/140 R, 75

[56] References Cited

U.S. PATENT DOCUMENTS

| 3,373,436 | 3/1968 | Auphan | 346/75 |
| 3,493,004 | 2/1970 | Hellbaum | 137/81.5 |
| 3,747,120 | 7/1973 | Stemme | 346/140 X |
| 3,848,118 | 11/1974 | Rittberg | 346/140 X |
| 3,848,258 | 11/1974 | Mahoney | 346/140 R |
| 3,930,260 | 12/1975 | Sicking | 346/140 R |
| 4,104,645 | 8/1978 | Fischbeck | 346/140 R |

Primary Examiner—Joseph W. Hartary

[57] ABSTRACT

In a coincidence vector gate ink jet, a droplet is expressed from an outlet orifice by a coincident pressure produced by a pair of transducers at an outlet orifice. In this type of ink jet, it is normal for one of a cooperating pair of transducers to be activated in a non-coincident mode. In the non-coincident mode, a droplet is not expressed from an outlet orifice as long as the pressure produced by the one transducer remains below a given threshold. A pressure absorbing chamber is provided, which permits this threshold pressure to be sustantially increased to a level substantially above the minimum coincident pressure produced by the pair of transducers to express a droplet from the orifice. This increase in the threshold pressure is an increase in the operating window. A greater operating window permits greater latitudes in manufacturing variation and permits greater latitudes in pressure variation to change the size of a droplet to effect halftoning.

18 Claims, 30 Drawing Figures

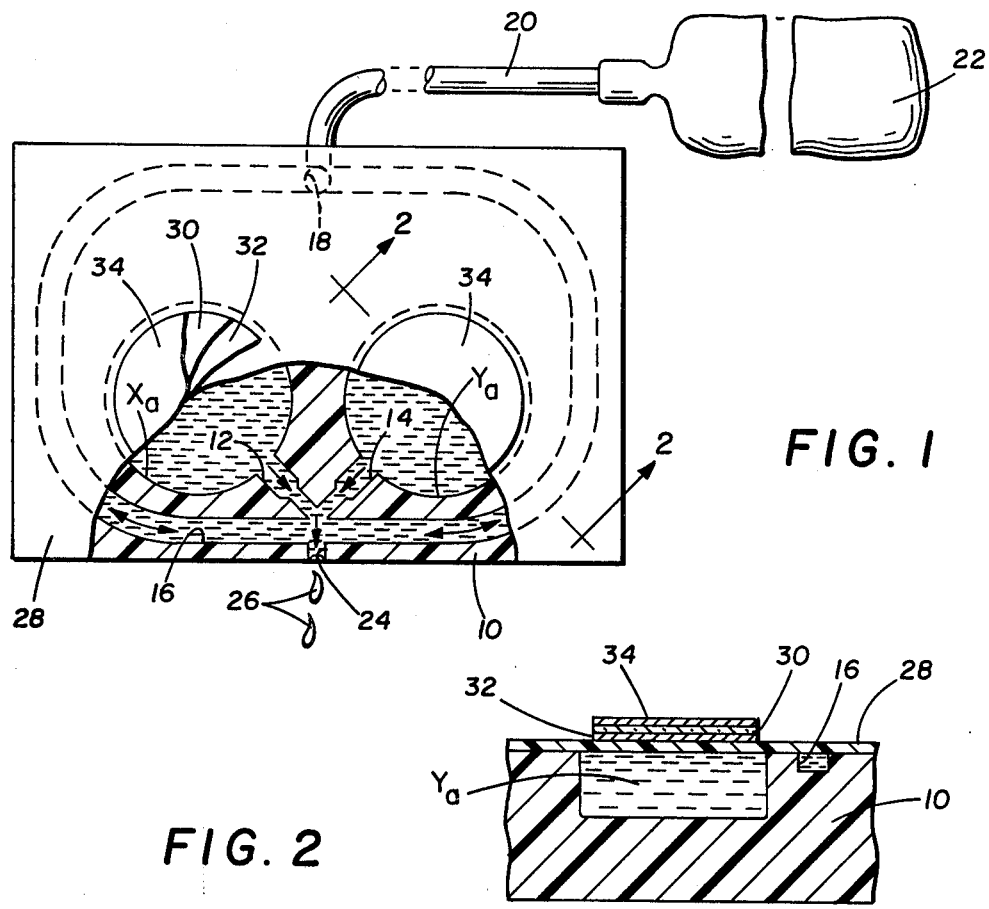
FIG. 1
FIG. 2
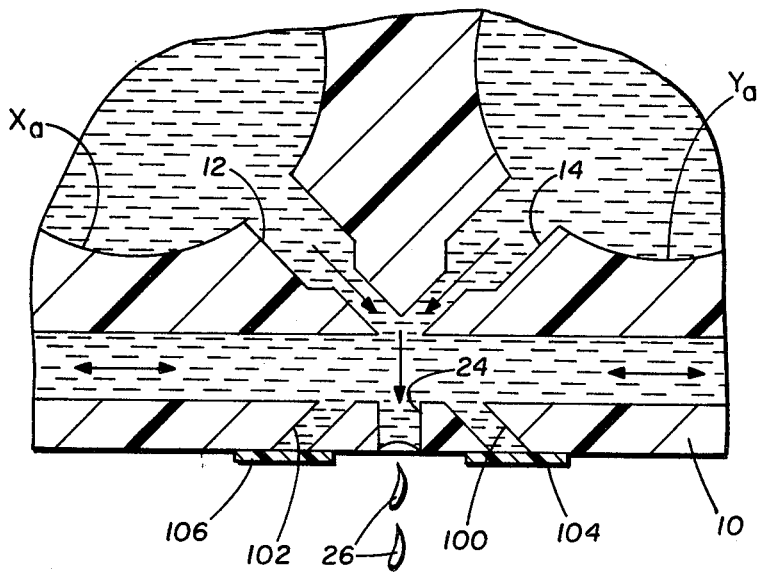
FIG. 3

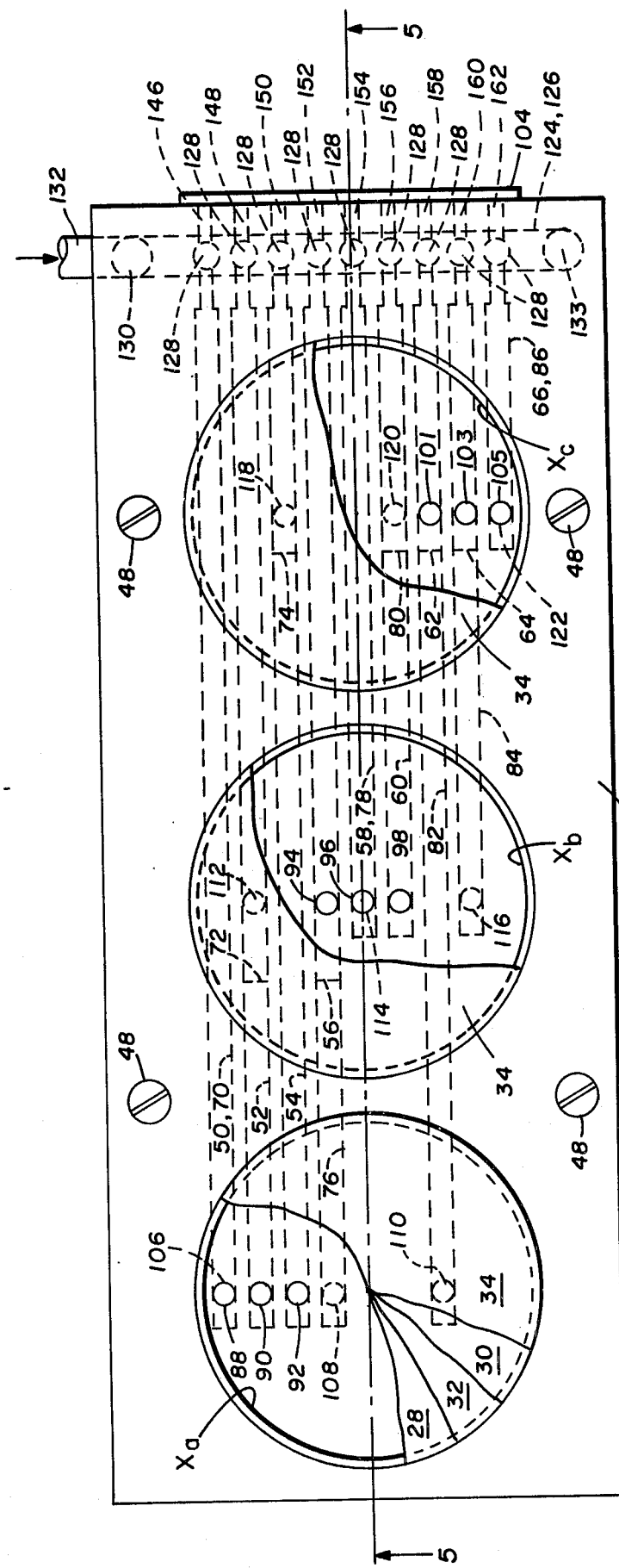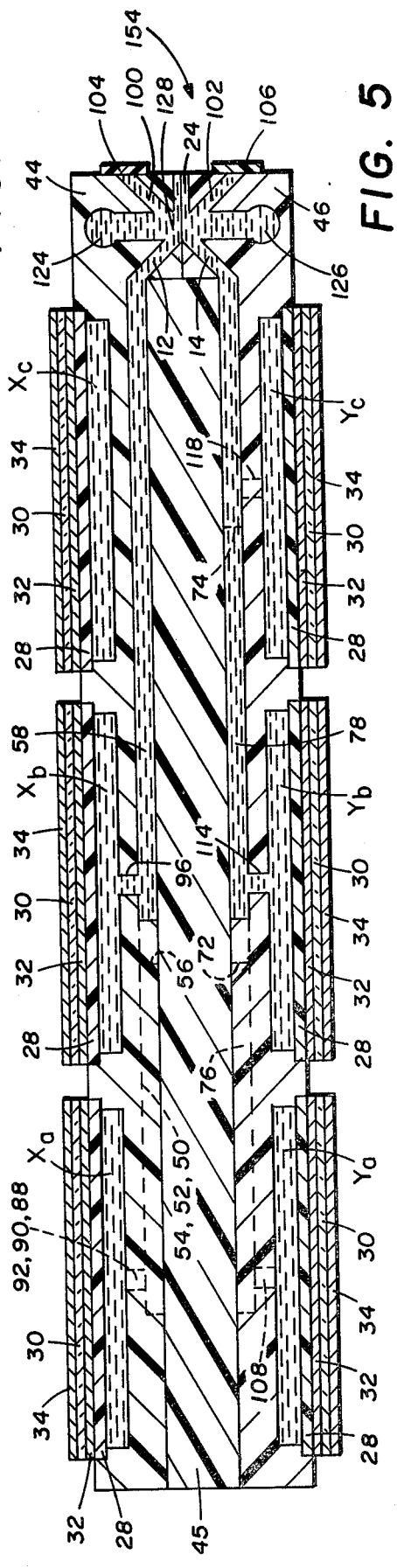

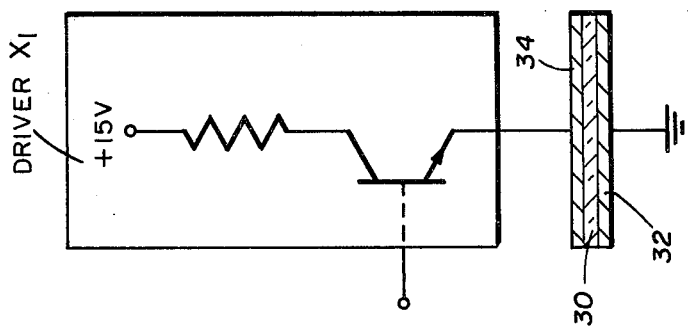
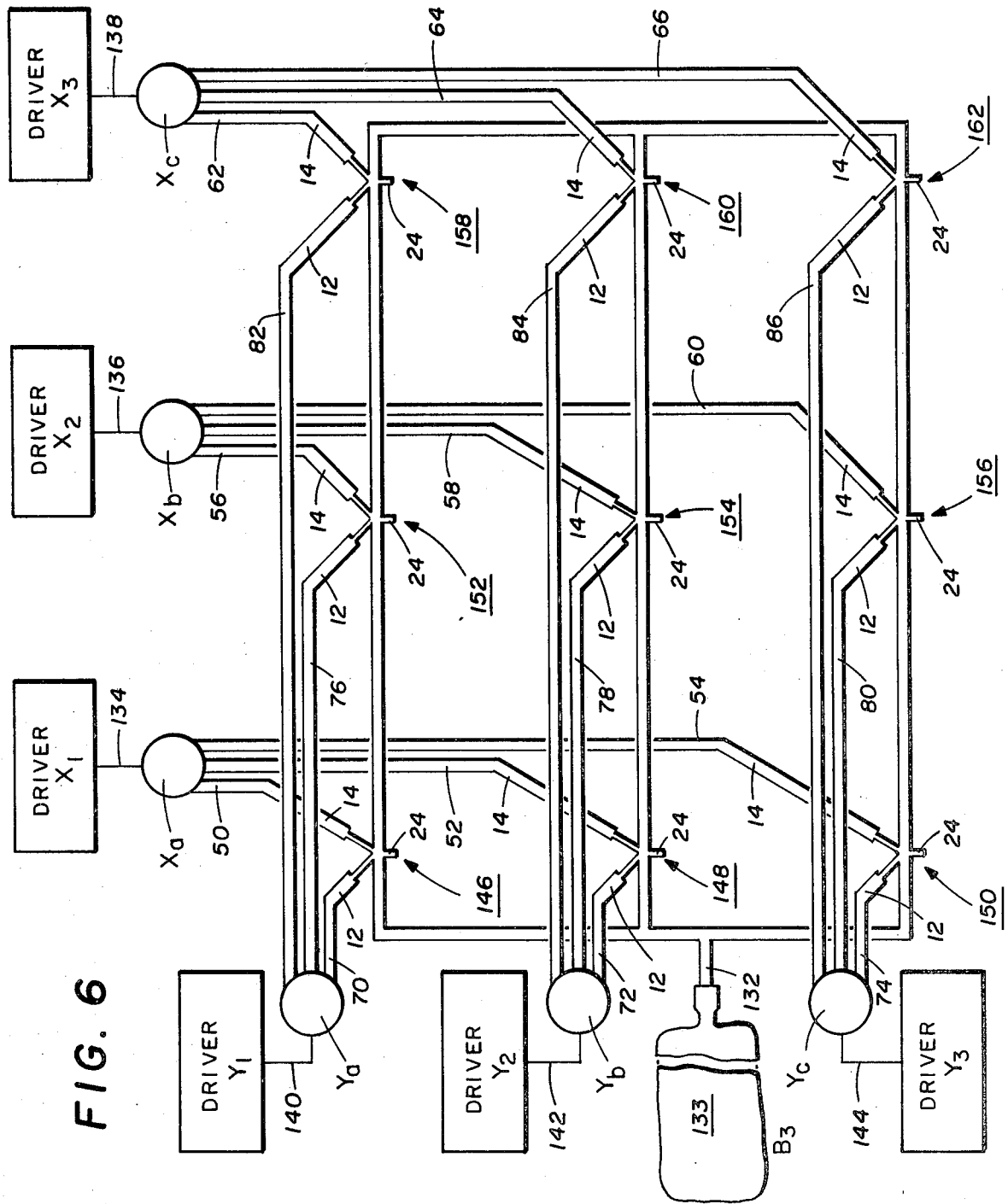
FIG. 6
FIG. 7

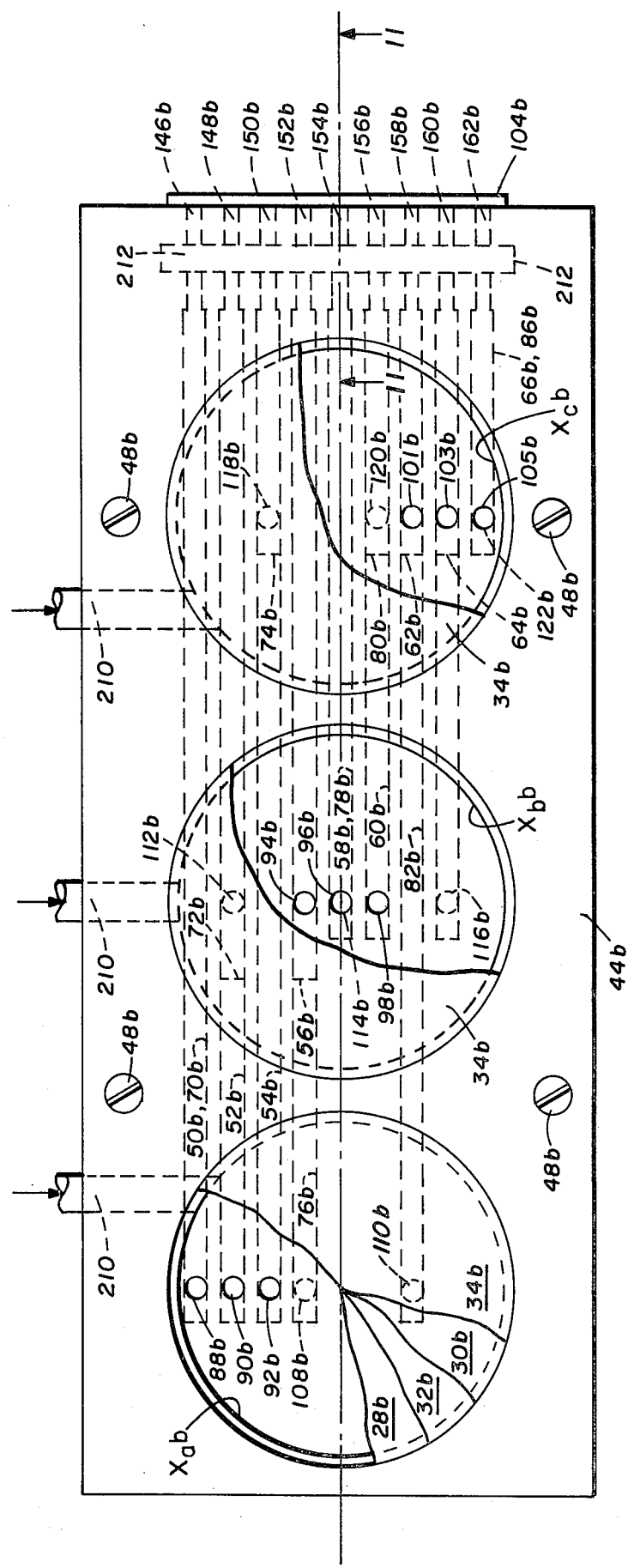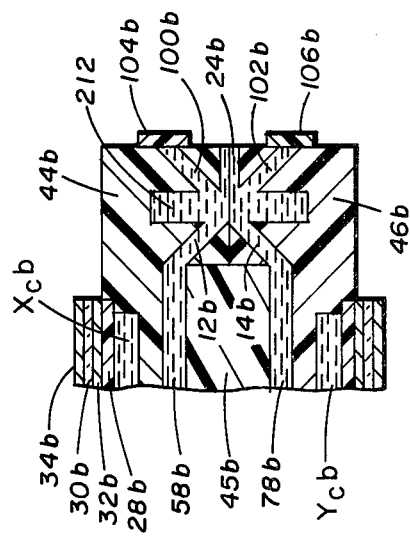
FIG. 10
FIG. 11

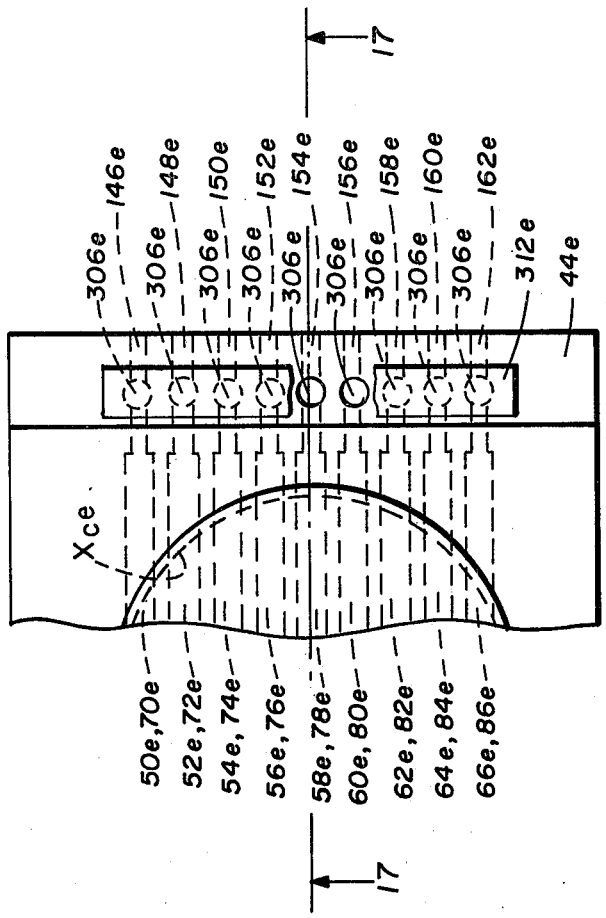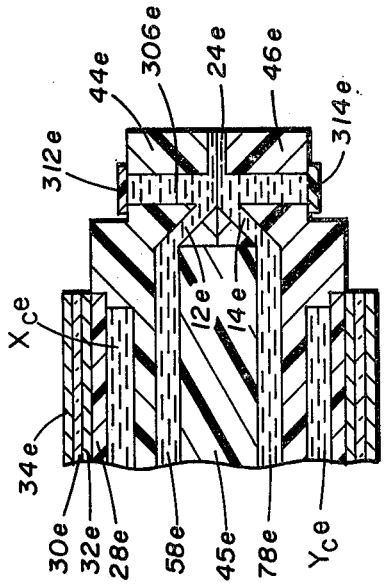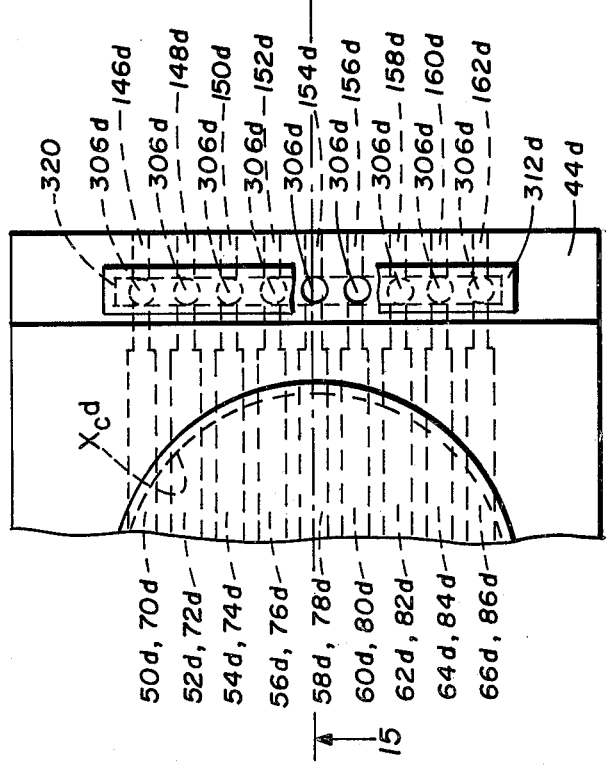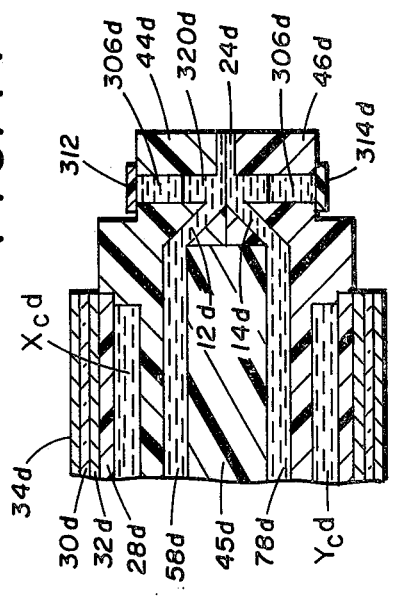
FIG. 16
FIG. 17
FIG. 14
FIG. 15

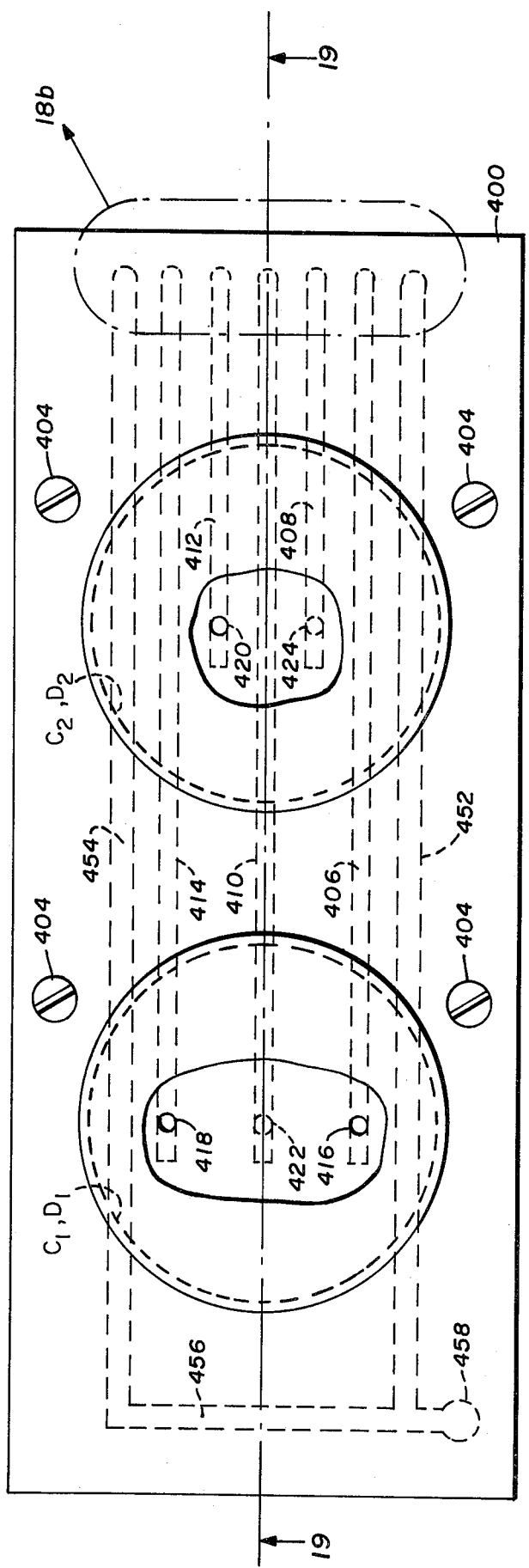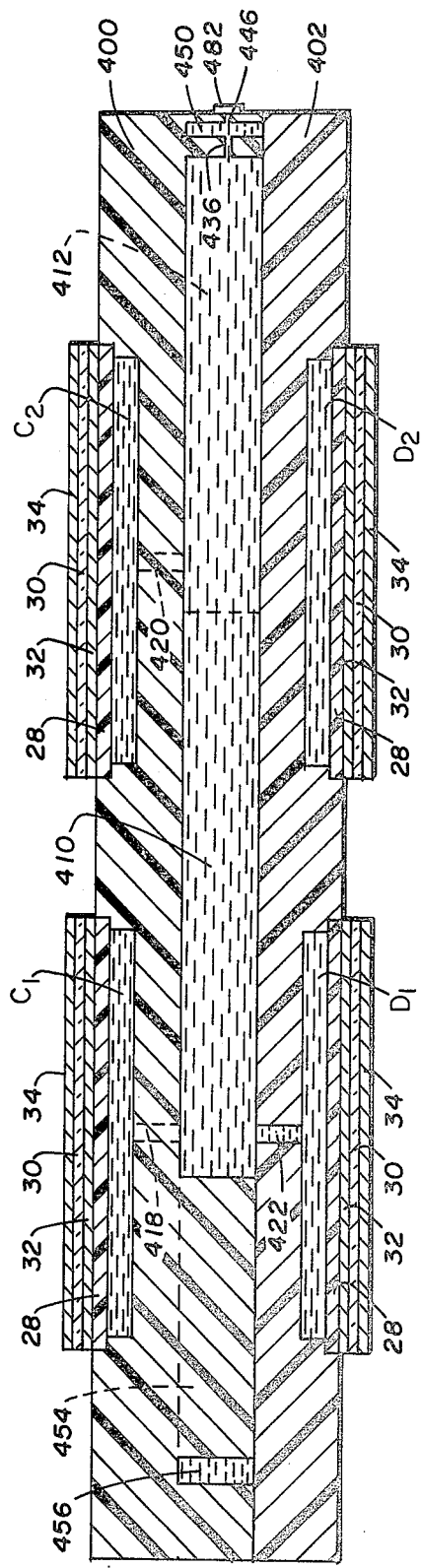

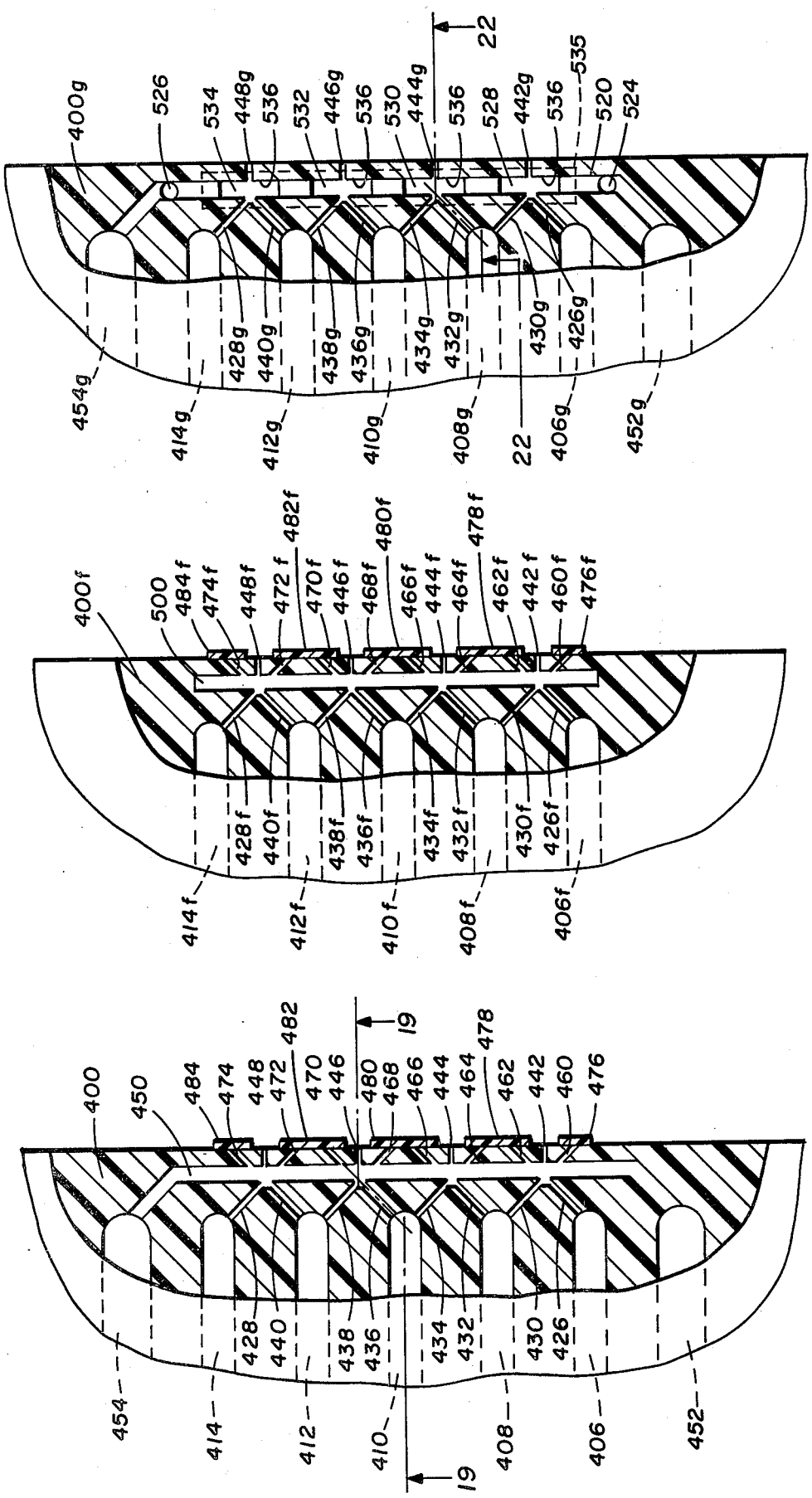

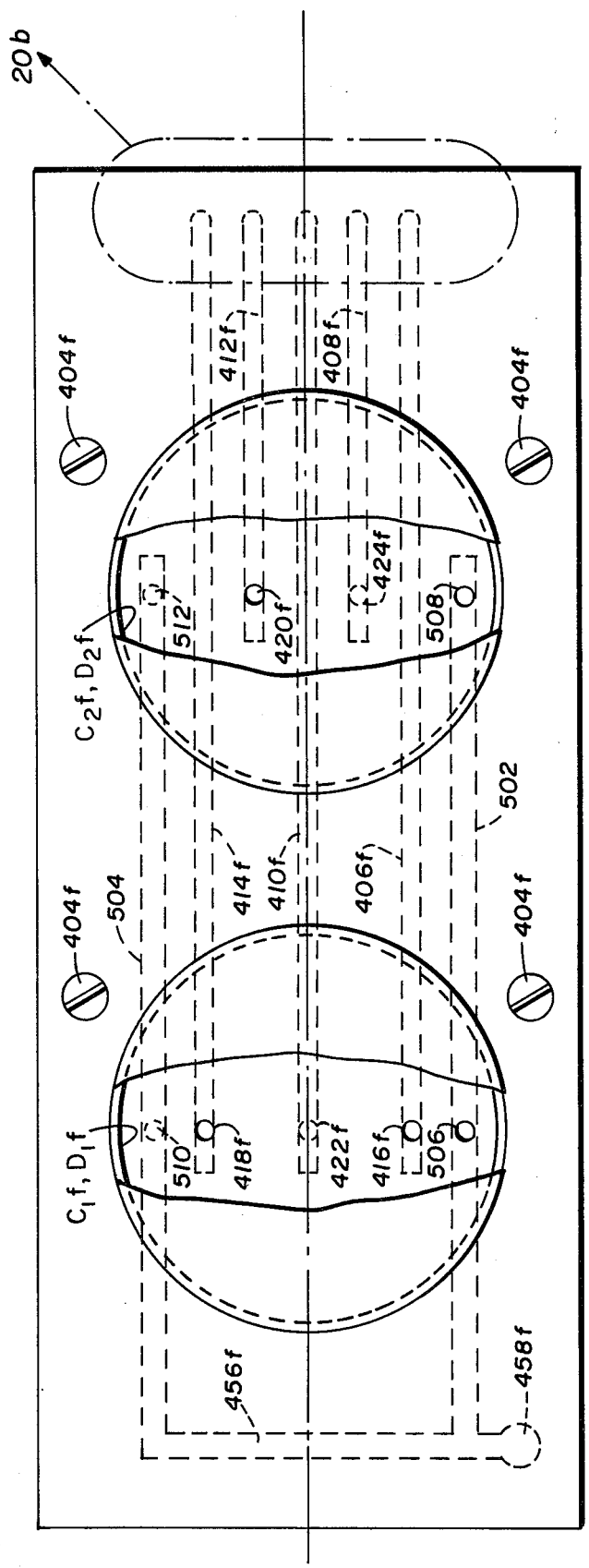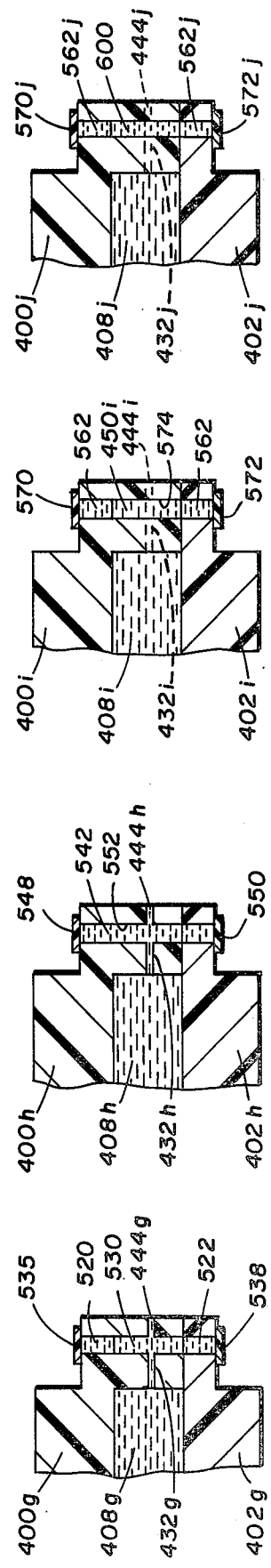
FIG. 20a
FIG. 28
FIG. 26
FIG. 24
FIG. 22

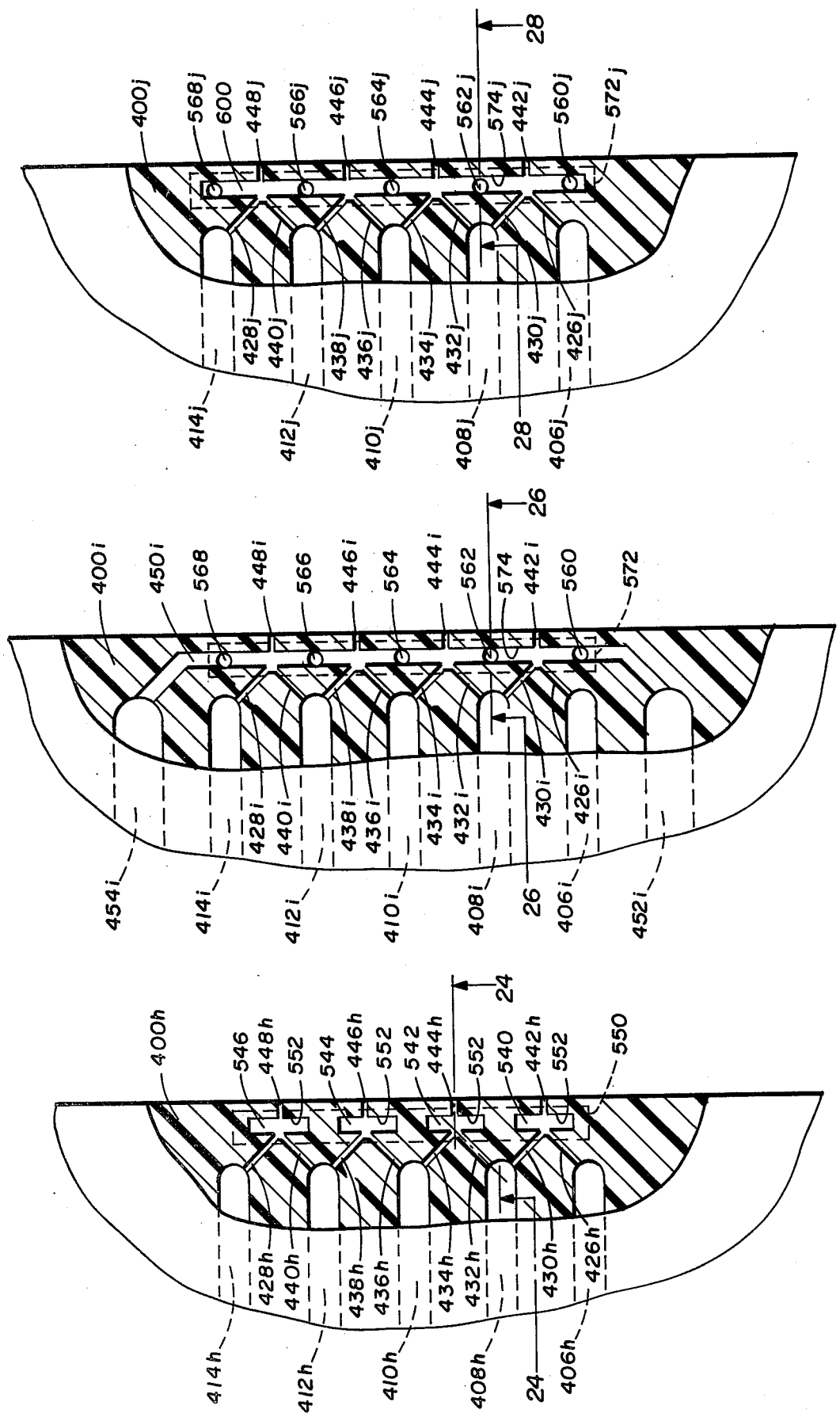

COINCIDENCE GATE INK JET WITH INCREASED OPERATING PRESSURE WINDOW

DESCRIPTION OF INVENTION

This invention relates to a coincidence vector gate ink jet.

Coincidence vector gate ink jets are ink jets which rely upon activation of a particular two transducers to produce a coincident pressure increase at an orifice to express an ink droplet from the orifice. When only one of the transducers is activated in a non-coincident mode, a droplet will not be expressed from the orifice unless a given maximum pressure threshold for one transducer is surpassed. A minimum pressure in each transducer must be maintained to guarantee a droplet when both transducers are activated in the coincident mode. At the present time, the operating window between the maximum and minimum pressures is very limited, not allowing to a significant degree for manufacturing variations or allowing for varying the droplet expression pressures to change the size of droplets for half toning.

It is an object of this invention to increase the window in operating pressures between a threshold maximum pressure for each transducer and a minimum pressure for each transducer in coincidence vector gate ink jets.

Other objects of the invention will become apparent from the following description with reference to the drawings wherein:

FIG. 1 is a cutaway view of a sample ink jet assembly illustrating a coincidence gate principle;

FIG. 2 is a view taken along section line 2—2 of FIG. 1;

FIG. 3 is a modification of the embodiment of FIGS. 1 and 2 illustrating the principle of this invention;

FIG. 4 is a plan view of a linear array ink jet assembly;

FIG. 5 is a view taken along section line 5—5 of FIG. 4;

FIG. 6 is a schematic fluid circuit for the ink jet array of FIGS. 4 and 5;

FIG. 7 is a schematic of a typical electronic driver electrically connected to a piezoelectric member;

FIG. 10 is a view of another modification of the embodiment of FIGS. 4 and 5;

FIG. 11 is a view taken along section line 11—11 of FIG. 10;

FIG. 14 is a partial plan view of a modification of the embodiment of FIGS. 12 and 13;

FIG. 15 is a view taken along section line 15—15 of FIG. 14;

FIG. 16 is a partial plan view of another modification of the embodiment of FIGS. 12 and 13;

FIG. 17 is a view taken along section line 17—17 of FIG. 16;

FIGS. 18a and 18b are views of a different embodiment of a linear ink jet array incorporating the principles of this invention;

FIG. 19 is a view taken along section line 19—19 of FIG. 18;

FIGS. 20a and 20b are views of a modification of the embodiment of FIGS. 18a, b and 19;

FIG. 21 is a partial plan view of a modification of the embodiment of FIGS. 18a, b and 19.

FIG. 22 is a view along section line 22—22 of FIG. 21;

FIG. 23 is a partial plan view of another modification of the embodiment of FIGS. 18a, b and 19;

FIG. 24 is a view taken along section line 24—24 of FIG. 23;

FIG. 25 is a partial plan view of yet another modification of the embodiment of FIGS. 18a, b and 19;

FIG. 26 is a view taken along section line 26—26 of FIG. 25;

FIG. 27 is a partial plan view of a modification of the embodiment of FIGS. 25 and 26; and FIG. 28 is a view taken along section line 28—28 of FIG. 27.

Figure 12:
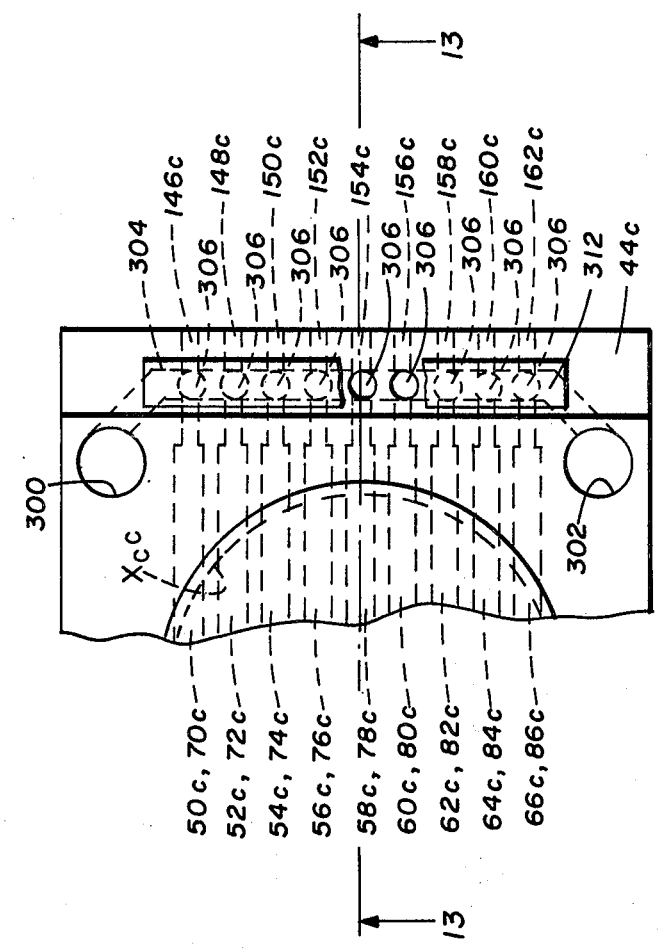
FIG. 12 is a partial plan view of still another modification of the embodiment of FIGS. 4 and 5.

Referring to FIG. 1, a cutaway view of a housing member 10 of an ink jet housing assembly is shown illustrating the principles of a coincidence gate ink jet. A pair of transducer chambers $X_a$ and $Y_a$ is provided in the member 10. Fluid pressure passages 12 and 14 lead from the chambers $X_a$, $Y_a$, respectively, to a liquid ink supply rectifier passage 16 where the three passages intersect. The liquid ink supply passage 16 is communicated to a port 18 which in turn is communicated through a conduit 20 to an ink supply reservoir 22, located remotely from the housing, which comprises a sealed flexible bag. Also, at the intersection is an outlet orifice 24 through which ink droplets 26 are expressed onto a copy medium.

Referring to FIG. 2, the chambers and passages are sealed by a flat flexible layer 28 bonded to the member 10. The transducer chambers $X_a$, $Y_a$ are fluid tight except for passages 12 and 14 communicating therewith. The transducer chambers and passages 12, 14 and 16 are completely filled with liquid ink. A piezoelectric ceramic member 30 is sandwiched between and bonded to a pair of electrodes 32 and 34 with the electrode 32 being bonded to the layer 28 thereby effectively bonding the piezoelectric member 30 thereto. The piezoelectric member 30 is polarized during the manufacture thereof to contract in a plane parallel to the plane of the flexible layer 28 when excited by applying a voltage potential across the conductive members 32 and 34. Contraction of the piezoelectric member 30 will cause the flexible layer 28 to buckle inwardly, thereby decreasing the volume in its respective chamber and effecting pressure on the liquid ink therein. The members 10 and 28 of the housing may be glass or plastic.

When the piezoelectric member for either transducer $X_a$ or $Y_a$ is activated, a fluid pressure pulse will occur in a respective one of passages 12 and 14 causing displacement of ink along the respective passage. The passages 12 and 14 are at such an angle relative to the orifice 24, the impedance to liquid flow in passage 16 relative to the impedance to liquid flow in orifice 24, and the magnitude and duration of a pressure pulse exerted by the transducer chambers $X_a$, $Y_a$ are designed that the ink stream expressed from only one passage at a time will entirely miss orifice 24 and displace ink in the ink supply passage 16 while the ink within orifice 24 will not be disturbed to the extent of expressing a droplet therethrough. The orifice 24 is located relative to the intersection of the passages 12, 14 and the magnitude and duration of the pressure pulse exerted by the transducer chambers $X_a$, $Y_a$ are so designed that the summation vector of the fluid momentum vectors in passages 12 and 14 will lie on the axis of the orifice 24. Thus, only when the piezoelectric members for both transducer chambers $X_a$, $Y_a$ are activated in a manner that pressure pulses generated by the respective transducers coincide at a location from the intersection of passages 12, 14 to the orifice 24 will an ink droplet 26 be expressed from orifice 24. It should be understood that the peaks of the pressure pulses generated by both transducers do not necessarily coincide between the intersection of passages 12 and 14 and the orifice 24, but there must be at least an overlap of the pressure pulses thereat. In this illustration, the orifice is hydraulically equal distance from each transducer chamber, and the piezoelectric members for both transducers will be simultaneously or coincidentally activated.

Since the transducer chambers are fluid tight except for the passages 12 and 14 communicating therewith, at the termination of a pressure pulse, ink is drawn into the passage 12 or 14 from which ink was expressed. If a pulse is applied to only one of the passages 12, 14, then most of the ink expressed therefrom will be drawn back into the passage with the remainder of the ink drawn into the passage being supplied from supply passage 16. If a pulse was applied to both passages 12, 14 simultaneously, resulting in an ink droplet being expressed from orifice 24, then ink from supply passage 16 will be drawn into both passages 12, 14 after pulse termination. Thus, the ink within the pressure chambers $X_a$, $Y_a$ and most of passages 12, 14 is stagnant or confined therein and acts only as a mechanical ram for expressing ink droplets through the orifice 24 with the ink forming the droplets being supplied from the reservoir 22.

When only one of the transducers $X_a$, $Y_a$ is activated in a non-coincident mode, a droplet will not be expressed from the orifice 24 unless a given pressure threshold is surpassed. For instance, if it takes 100 psi to express a droplet when the two transducers $X_a$, $Y_a$ are activated in a coincident mode to produce a coincident pressure increase at the orifice, only 50 psi need be produced by each transducer $X_a$, $Y_a$. Also, a pressure increase by only one transducer in a non-coincident mode of approximately 100 psi (threshold) will also produce a droplet from orifice 24. Thus, the maximum pressure exerted by one transducer in a noncoincident mode must be maintained below threshold, or in this case, approximately 100 psi. The minimum pressure must be maintained at 50 psi to assure expression of a droplet from orifice 24 when both transducers are activated in a coincident mode. Thus, the operating window between the maximum and minimum pressures is very limited, not allowing to a significant degree for manufacturing variations or for varying the droplet expression pressures to change the size of droplets for half-toning. An ink droplet size varies with the droplet expression pressure. To half-tone, it is desirable to significantly vary the pressure and thereby the drop size. The expression pressure may vary from 100 psi to 500 psi or more. This means that, at the maximum pressure, each transducer $X_a$, $Y_a$, in a coincident mode, must effect a pressure of approximately 250 psi each and still not express a droplet through orifice 24 when only one transducer is activated, in a non-coincident mode, although a combined pressure of 100 psi will produce such a droplet. The principle of this invention is directed toward opening the operating window and is explained with reference to FIG. 3.

Referring to FIG. 3, all elements which are the same as the embodiment of FIG. 1 are designated by the same reference numerals. A pressure absorption chamber 100 is aligned with the passage 12 and located on one side of orifice 24 and a pressure absorption chamber 102 is aligned with the passage 14 and located on the opposite side of the orifice 14. Elastic membranes 104 and 106 seal the outer opening of the chambers 100 and 102, respectively. The membrane 104 may be a thin (1 to 2 mil) Mylar film or other similar flexible material. Each time there is a pressure increase in passage 12 alone, a jet stream will be directed to the aligned chamber 100. The membrane 104 is designed to stretch under pressure to render the chamber 100 a path of least resistance compared to the resistance of the droplet orifice 24 and meniscus formed therein. Since the stream from inlet passage 12 is aligned with the pressure absorption chamber 100, the stream is in shear with the fluid in droplet orifice 24 and a majority of the pressure increase will be absorbed in the absorption chamber 100 by the expansion of the membrane 104. When passage 14 is pressurized, the absorption chamber 102 and elastic membrane 106 act in the same manner as chamber 100 and membrane 104 to absorb a substantial portion of the pressure increase in passage 14 with a very small proportion thereof being transmitted to the liquid in the outlet orifice 24.

The provision of pressure absorption chambers 100 and 102 allows a substantial pressure to be produced by either transducer $X_a$, $Y_a$ in a non-coincident mode without expressing a droplet from orifice 24, but yet the pressure for expressing a droplet from orifice 24 by a coincident increase of pressure at the orifice from both transducers will be substantially less. For instance, a combined coincident pressure from both transducers required to express a droplet can be designed to be approximately 100 psi or 50 psi each. However, the maximum pressure produced by one transducer before expressing a droplet may be as high as 250 psi or more due to the provision of the pressure absorbing chamber. Thus, the operating window has been opened where greater latitude with manufacturing variations is possible and a greater latitude of droplet expression pressures is possible for changing the size of a droplet for half-toning.

The coincidence gate principle in combination with the principle for increasing power differential can be incorporated in an array of ink jets as shown in FIGS. 4 and 5. All elements which are the same as the previous embodiments are designated by the same reference numerals. A glass or plastic housing comprises three members 44, 45 and 46 secured by screws 48. The member 44 has nine channels forming fluid pressure passages 50, 52, 54, 56, 58, 60, 62, 64 and 66. The member 46 has nine channels forming fluid pressure passages 70, 72, 74, 76, 78, 80, 82, 84 and 86. Located in the member 44 are fluid transducer chambers $X_a$, $Y_b$, and $X_c$, located in member 46 are fluid transducer chambers $Y_a$, $Y_b$ and $Y_c$. The chamber $X_a$ is communicated to pressure passages 50, 52, and 54 by inlet passages 88, 90 and 92, respectively. Chamber $X_b$ is communicated to pressure passages 56, 58 and 60 by inlet passages 94, 96 and 98, respectively. Chamber $X_c$ is communicated to pressure passages 62, 64 and 66 by inlet passages 101, 103 and 105, respectively. Chamber $Y_a$ is communicated to pressure passages 70, 76 and 82 by inlet passages 106, 108 and 110, respectively. Chamber $Y_b$ is communicated to pressure passages 72, 78 and 84 by inlet passages 112, 114 and 116, respectively. Chamber $Y_c$ is communicated to pressure passages 74, 80, and 86 by inlet passages 118, 120 and 122, respectively.

At the front end of each of the pressure passages 50, 52, 54, 56, 58, 60, 62, 64 and 66 in member 44 is an orifice inlet passage 12 and at the front end of each of the pressure passages 70, 72, 74, 76, 78, 80, 82, 84 and 86 is an orifice inlet passage 14. A supply passage 124 is located in member 44 and extends in a direction transverse to the pressure passages, and a supply passage 126 is located in member 46 and extends also in a direction transverse to the pressure passages. Orifices 24 are aligned with each pair of inlet passages 12 and 14. A plurality of laterally spaced vertical fluid rectifier passages 128 are communicated at one end to the passage 124 and at the other end to passage 126 and are located to provide a fluid rectifier layer between each orifice and the intersection of a pair of orifice inlet passages 12, 14. Referring to FIG. 4, a fluid supply inlet 132 communicates a vertical passage 130 with a fluid reservoir (not shown). The vertical passage 130 is communicated to laterally extending vertically spaced passages 124, 126 to provide a fluid supply path therefor. A vertical passage 133 communicates the end of the passages 124 and 126 with each other.

The following pairs of pressure passages are communicated with the orifices of the following jets: passages 70 and 50 with jet 146; passages 72 and 52 with jet 148; passages 74 and 54 with jet 150; passages 76 and 56 with jet 152; passages 78 and 58 with jet 154; passages 80 and 60 with jet 156; passages 82 and 62 with jet 158; passages 84 and 64 with jet 160; and passages 86 and 66 with jet 162.

Referring to FIG. 6, a schematic fluid circuit is illustrated for the array of nine coincidence gate ink jets disclosed in FIGS. 4 and 5. Six electrical input drivers $X_1$, $X_2$, $X_3$, $Y_1$, $Y_2$ and $Y_3$ are electrically connected to a piezoelectric member of transducer chambers $X_a$, $X_b$, $X_c$, $Y_a$, $Y_b$ and $Y_c$, respectively, by a respective one of electrical lines 134, 136, 138, 140, 142 and 144.

Referring to FIG. 7, there is illustrated a piezoelectric member 30 electrically connected to a typical electronic driver which is a NPN type transistor in an emitter follower configuration driven between a non-conductive state and a state of saturated conduction in response to positive going pulse-like input signals supplied to the base of the transistor. All of the electronic drivers are electrically connected to their respective piezoelectric members in the same manner.

The transducer chambers, conduits and pressure inlets as well as pulse duration and magnitude are all designed that the hydraulic properties at each ink jet are the same. Since an orifice may be hydraulically unequal distance away from the two transducers to which it is communicated, the transducers, in actual practice, will be activated out of phase with each other so the pressure pulse generated by each transducer will occur coincidentally at a location from the intersection of the pressure inlets 12, 14 to the orifice 24. The following table shows which jets express droplets therefrom when particular drivers are energized:

| Transducers Cooperatively Activated | Droplet Expressed From Jet |
| --- | --- |
| $X_a$, $Y_a$ | 146 |
| $X_a$, $Y_b$ | 148 |
| $X_a$, $Y_c$ | 150 |
| $X_b$, $Y_a$ | 152 |
| $X_b$, $Y_b$ | 154 |
| $X_b$, $Y_c$ | 156 |
| $X_c$, $Y_a$ | 158 |
| $X_c$, $Y_b$ | 160 |
| $X_c$, $Y_c$ | 162 |

The principle of this invention is incorporated in the ink jet array by providing pressure absorption passages 100, 102 on each side of the orifice 24 for each jet. The absorption passage 100 is aligned with the pressure inlet passage 14 and the absorption passage 102 is aligned with the pressure inlet passage 12. A membrane 104 extends in a lateral direction across the array of jets and is sealed to the front face of the housing member 44 to seal each chamber 100 from the exterior and provide an absorption member. A membrane 106 extends in a lateral direction across the array of jets and is sealed to the front face of the member 46 to seal each chamber 102 from the exterior and provide an absorption member. The absorption chambers 100 and 102 operate in the same manner as described for the embodiment of FIG. 3.

Figure 8:
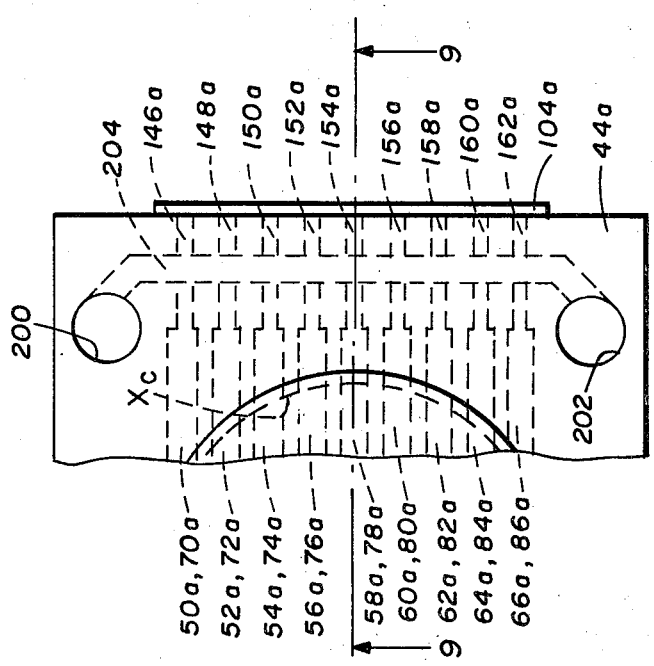
FIG. 8 is a modification of the embodiment of FIGS. 4 and 5.
Figure 9:
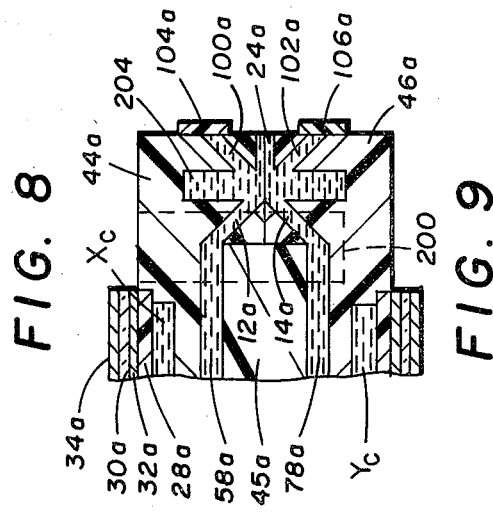
FIG. 9 is a view taken along section line 9—9 of FIG. 8.

Referring to FIGS. 8 and 9, the same construction of the invention is shown incorporated in a fluid rectifier configuration which is different than the embodiment of FIGS. 4 and 5. All elements which are the same as in the embodiment of FIGS. 4 and 5 are designated by the same reference numerals only with an "a" affixed thereto. In this embodiment, the reservoir (not shown) is connected to port holes 200 and 202 which communicates the reservoir to a laterally extending chamber 204.

Referring to FIGS. 10 and 11, the same construction of the invention is shown incorporated in an embodiment in which the fluid rectifier is eliminated. All elements which are the same as in the embodiment of FIGS. 4 and 5 are designated by the same reference numerals only with a "b" affixed thereto. In this embodiment, each fluid chamber is directly connected with a reservoir (not shown) through fluid supply inlet passages 210. A laterally extending chamber 212 extends between the orifices 24b and the intersection of pressure inlet passages 12b and 14b of each jet. In this particular instance, the fluid in the chamber 212 absorbs some pressure along with the pressure absorption chambers 100b and 102b.

Figure 13:
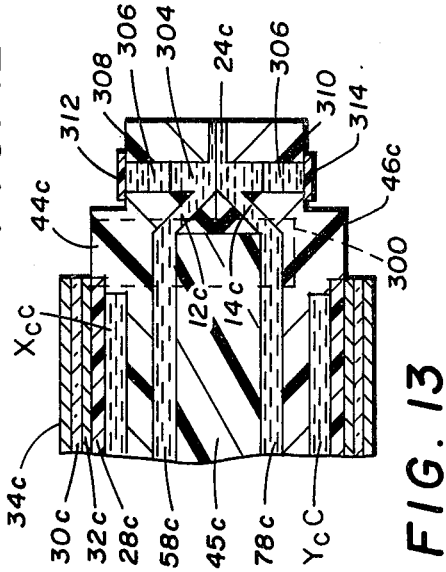
FIG. 13 is a view taken along section line 13—13 of FIG. 10.

Referring to FIGS. 12 and 13, a different type of pressure absorption chamber is shown for applying the principle of this invention. All elements which are the same as in the embodiment of FIGS. 4 and 5 are designated by the same reference numerals, only with a "c" affixed thereto. The reservoir (not shown) is connected to port holes 300 and 302 which communicates the reservoir to a laterally extending rectifier chamber 304. A vertical cylindrical pressure absorbing chamber 306 is provided for each orifice. Each chamber 306 descends from the top outer surface 308 through the rectifier chamber 304 and through the bottom outer surface 310. A laterally extending flexible membrane 312 extends across all of the top openings of chambers 306 and is sealed to the top surface 308 of member 44c and a flexible membrane 314 extends across all of the bottom openings of chambers 310 and is sealed to the bottom surface 310 of member 46c. A stream expressed from either pressure inlet 12c or 14c will strike the wall of the chamber 306 which will produce a churning with a generally resultant vertical force in the chamber 306 being absorbed by stretching of either membrane 312 or 314 depending upon from which pressure inlet passage 12c or 14c the stream is expressed.

Referring to FIGS. 14 and 15, the same pressure absorbing chamber arrangement as in FIGS. 12 and 13 is shown, only each fluid chamber is directly connected to the fluid reservoirs (not shown) as in the embodiment of FIGS. 8 and 9. All elements which are the same as the embodiment in FIGS. 10 and 11 are designated by the same reference numerals only with a "d" affixed thereto. A laterally extending chamber 320 extends between the orifices 24d and the intersection of pressure inlet passages 12d and 14d of each jet. In this particular embodiment, the fluid in chamber 320d absorbs some pressure along with the pressure absorption chambers 306d.

Referring to FIGS. 16 and 17, those elements which are the same as in the embodiment of FIGS. 12 and 13 are designated by the same reference numerals, only with an "e" affixed thereto. The same pressure absorbing chamber arrangement in FIGS. 14 and 15 is shown, only the lateral chamber 320 between the orifices 24d and the intersection of pressure passages 12d and 14d has been removed.

In all the embodiments disclosed the present invention has been incorporated in an ink jet array where the pressure inlet passages 12 and 14 converge in a vertical plane or, in other words, a plane transverse to the plane of the jet array. This invention may also be applied to ink jet arrays where the pressure inlet passages 12 and 14 converge in a horizontal plane, or in other words, in the same plane as or a plane parallel to the plane of the jet array. An embodiment disclosing this type of jet array is shown in FIGS. 18a, 18b, and 19. A four jet array is shown for simplicity, it being sufficient for illustrating the incorporation of the coincidence gate principle and the pressure absorbing principle. A glass or plastic housing comprises two members 400, 402 secured together by screws 404. The member 400 has five channels forming fluid pressure passages 406, 408, 410, 412 and 414. Located in member 400 are fluid transducer chambers $C_1$ and $C_2$, and located in member 402 are fluid transducer chambers $D_1$ and $D_2$. The chamber $C_1$ is communicated to pressure passages 406 and 414 by inlet passages 416 and 418, respectively. Chamber $C_2$ is communicated to pressure passage 412 by inlet passage 420. Chamber $D_1$ is communicated to pressure passage 410 by inlet passage 422. Chamber $D_2$ is communicated to pressure passage 408 by inlet passage 424. The pressure passages 406 and 414 each feed into an orifice inlet passage 426 and 428, respectively. The pressure passage 408 feeds into two orifice inlet passages 430 and 432. Referring to FIG. 18b, the pressure passage 410 feeds into two orifice inlet passages 434 and 436, and the pressure passage 412 feeds into two orifice inlet passages 438 and 440. The pair of orifice inlet passages 426 and 430 intersect each other opposite an orifice 442; the pair of orifice inlet passages 432 and 434 intersect each other opposite an orifice 444; the pair of orifice inlet passages 434 and 436 intersect each other opposite an orifice 446; and a pair of orifice inlet passages 440 and 428 intersect each other opposite an orifice 448.

A fluid rectifier chamber 450 extends laterally across the array of orifices and provides a fluid layer between the intersection of each pair of orifice inlet passages and a respective orifice. The rectifier chamber 450 is communicated at one end to a fluid supply passage 452 located in member 400 and at the other end to a fluid supply passage 454, also located in member 400, which fluid supply passages are joined together by a laterally extending supply passage 456 located in member 400. A downwardly extending inlet passage 458 in member 400 is connected to the passage 456 and connected to a fluid supply reservoir (not shown) to communicate the reservoir with the rectifier chamber 450. Each transducer is operated by a piezoelectric member as in the previous embodiments with the same elements thereof as described in the embodiment of FIGS. 1 and 2 being designated by the same reference numerals. Each outlet orifice has a pair of pressure absorption chambers located on each side thereof with each absorption chamber being aligned with a respective orifice inlet passage. A pair of pressure absorption chambers 460 and 462 are associated with orifice 442 and are aligned with orifice inlet passages 430 and 426, respectively. Absorption chambers 464 and 466 are associated with orifice 444 and are aligned with orifice inlet passages 434 and 432, respectively. Absorption chambers 468 and 470 are associated with orifice 446 and are aligned with orifice inlet passages 438 and 436, respectively, and absorption chambers 472 and 474 are associated with the orifice 448 and are aligned with orifice inlet passages 428 and 440, respectively. Thin flexible membranes 476, 478, 480, 482 and 484 are adhered to the housing to seal the pressure absorption chambers from the exterior thereof and to provide a pressure absorbing member.

The coincidence gating of this embodiment is the same as the other embodiments with droplets being expressed from the orifices in accordance with the following:

| Transducers Cooperatively Engaged | Droplet Expressed From Jet |
|---|---|
| $C_1, D_2$ | 442 |
| $D_2, D_1$ | 444 |
| $D_1, C_2$ | 446 |
| $C_2, C_1$ | 448 |

Referring to FIGS. 20a and 20b, the same type of ink jet array is shown as in FIGS. 16 and 17, only the fluid supply reservoir is not connected to the fluid layer 500 between the orifices and the intersection of the orifice inlet passages. Fluid supply refill is provided directly to the transducer chambers. In this embodiment all elements which are the same as the embodiment of FIGS. 18 and 19 are designated by the same reference numerals, only with an "f" affixed thereto. A pair of supply passages 502 and 504 are communicated with the reservoir (not shown) by passage 456F which intersects both passages. Passages 506 and 508 extend upwards from the supply passage 502 into the transducer chambers $C_1f$ and $C_2f$, respectively. Passages 510 and 512 extend downwards from the supply passage 504 into the transducer chambers $D_1f$ and $D_2f$, respectively.

Referring to FIGS. 21 and 22, a modification of the embodiment of FIGS. 18 and 19 is illustrated. All elements which are the same as in the embodiment of FIGS. 16 and 17 are designated by the same reference numeral, only with a "g" affixed thereto. In this embodiment a pair of vertically spaced laterally extending fluid rectifier supply passages 520 and 522 are communicated with the fluid supply passages 452g and 454g by vertical passages 524 and 526, respectively. Four laterally spaced vertical energy absorption chambers 528, 530, 532 and 534 are communicated with the laterally extending passages 520, 522 and are located between a respective orifice 442g, 444g, 446g, 448g and a respective intersection of the orifice inlet passages. A flexible membrane 535 spans across the top of the housing 400g and a flexible membrane 538 spans across the bottom of the housing 402g to seal off the energy absorbing chambers from the exterior. When only the pressure is increased in one orifice inlet passage of a cooperative pair, a jet stream will miss the orifice and strike a wall 536 on a particular side of the orifice with the resultant turbulence effected thereby being absorbed by the portion of the membranes 535 and 538 associated therewith. The separate absorption chambers also reduce cross talk between the orifices.

Referring to FIGS. 23 and 24, a modification of FIGS. 18 and 19 is shown. All elements which are the same as the embodiment of FIGS. 18 and 19 are designated by the same reference numerals only with an "h" affixed thereto. In this embodiment the fluid reservoir is connected directly with the transducer chambers. A plurality of laterally spaced, vertically extending pressure absorbing chambers 540, 542, 544 and 546 are located between a respective orifice and intersection of a respective pair of orifice inlet passage means. A flexible membrane 548 spans across the top of housing 400h and a flexible membrane 550 spans across the bottom of the housing 402h to seal off the pressure absorbing chambers from the exterior. When pressure is increased in one orifice outlet passage of a cooperative pair, a jet stream will miss the orifice and strike a wall 552 on a particular side of the orifice with a resultant pressure surge and turbulence effected thereby being transmitted to the absorbing chamber and absorbed by the portion of the membranes 548 and 550 associated therewith.

Referring to FIGS. 25 and 26, there is illustrated still another modification of FIGS. 18 and 19. All elements which are the same as the elements in the embodiment of FIGS. 18 and 19 are designated by the same reference numerals, only with an "i" affixed thereto. In this particular embodiment, a plurality of laterally spaced vertically extending pressure absorbing chambers 560, 562, 564, 566 and 568 are in communication with the fluid rectifier chamber 450i. The chambers 562, 564 and 566 are located between a respective pair of orifices and the chambers 560 and 568 are located to one side of orifices 442i and 448i, respectively. A flexible membrane 570 spans across the top of the housing 400i and a flexible membrane 572 spans across the bottom of the housing 402i to seal off the pressure absorbing chambers from the exterior. When the pressure is increased in one orifice outlet passage of a cooperative pair, a jet stream will miss the orifice and strike a wall 574 of the fluid rectifier chamber with a resultant pressure surge and turbulence effected thereby being partially transmitted to the absorbing chamber and absorbed by the portion of the membranes 570 and 572 associated therewith. In this particular embodiment, the fluid in chamber 450i absorbs some pressure along with the pressure absorption chambers.

Referring now to FIGS. 27 and 28, a modification of the embodiment of FIGS. 25 and 26 is illustrated. All elements which are the same as in the embodiment of FIGS. 25 and 26 are designated by the same reference numerals, only with a "j" affixed thereto. This embodiment differs from the embodiment of FIGS. 25 and 26 in that the fluid supply from the reservoir is fed directly to the transducer chambers. A fluid layer in chamber 600 is provided between the intersection of the intersections of the orifice passages and the orifices. The chambers 560j, 562j, 564j, 566j and 568j and the chamber 600 act together as a pressure absorbing unit.

Obviously, some embodiments are not as efficient a pressure absorber as other embodiments, but the operating window is still significantly increased. Furthermore, the membrane sealing the pressure absorbing chambers could be eliminated. In this instance, the maximum pressure absorbed by the chamber would be controlled by the meniscus tension in the chamber, as the pressure would have to be kept below a level which could cause ink droplet expression through the unsealed chamber opening. Obviously, this construction would not be as efficient as a construction which includes the membrane, but the operating window would still be significantly increased.

It should be realized that each transducer does not have to produce substantially equal pressures, but one may produce a major portion of the coincident pressure required to express a droplet.

What is claimed is:

1. A coincidence gate ink jet comprising: an outlet orifice, a first transducer chamber, a second transducer chamber, first passage means communicating said first transducer chamber to said orifice, second passage means communicating said second transducer chamber to said orifice, said first and second passage means intersecting each other adjacent said orifice, the axis of each of said first and second passage means at said intersection being at an angle with the axis of said orifice, pressure absorbing chamber means communicated with said orifice and intersection, means for allowing fluid displacement in said absorbing chamber means when only one transducer is actuated, said pressure absorbing chamber means being so designed and arranged relative to said intersection and said orifice that the minimum pressure required to express a droplet through said orifice upon actuation of only one of said transducers will be increased compared to the minimum pressure required to express a droplet from the orifice of a similar ink jet structure without the absorbing chamber means.

2. The structure as recited in claim 1 wherein said means for allowing fluid displacement in said absorbing chambers comprises an opening in each of said absorbing chambers and an elastic membrane sealing a respective said opening in a respective said absorbing chamber.

3. A coincidence gate ink jet comprising: an outlet orifice, a first transducer chamber, a second transducer chamber, first passage means communicating said first transducer chamber to said orifice, second passage means communicating said second transducer chamber to said orifice, said first and second passage means intersecting each other adjacent said orifice, the axis of each of said first and second passage means at said intersection being at an angle with the axis of said orifice, a pair of pressure absorbing chambers, one of said pressure absorbing chambers being on one side of said orifice and being generally aligned with said first passage means, the other of said pressure absorbing chambers being on the opposite side of said orifice and being generally aligned with said second passage means, and means for allowing fluid displacement in said absorbing chambers, whereby the minimum pressure required to express a droplet through said orifice upon actuation of only one of said transducers will be increased compared to the minimum pressure required to express a droplet from the orifice of a similar ink jet structure without the absorbing chambers.

4. The structure as recited in claim 3, wherein said means for allowing fluid displacement in said absorbing chambers comprises an opening in each of said absorbing chamber means and an elastic membrane sealing a respective said opening in a respective said absorbing chamber.

5. The structure as recited in claim 3 further comprising a fluid chamber in communication with and interposed between said intersection and said orifice.

6. The structure as recited in claim 5 wherein said fluid chamber is communicated to a fluid supply reservoir.

7. An array of coincidence gate ink jets comprising: a housing, a plurality of laterally spaced apart outlet orifices in said housing, each of said orifices having first and second orifice inlet passages communicated therewith, said first and second inlet passages intersecting each other adjacent said orifice, the axis of each of said first and second inlet passages at said intersection being at an angle with the axis of its respective said orifice, pressure absorbing chamber means for each orifice adjacent said intersection and aligned with one of said passage means, means for allowing fluid displacement in said absorbing chamber means, whereby the minimum pressure required to express a droplet through a respective said orifice upon an increase in pressure in said one inlet passage will be increased compared to the minimum pressure required to express a droplet from the orifice of a similar ink jet structure without the absorbing chambers.

8. The structure as recited in claim 7 wherein said means for allowing fluid displacement in said absorbing chamber means comprises an opening in each of said absorbing chamber means and an elastic membrane sealing a respective said opening in a respective said absorbing chamber.

9. The structure as recited in claim 7 wherein the axes of a respective said first and second inlet passages of said intersection are generally in a plane which is generally transverse to the lateral direction in which said outlet orifices are spaced apart, and the axis of a respective said absorption chamber means is generally in said plane.

10. The structure as recited in claim 8 wherein the axes of a respective said first and second inlet passages at said intersection are generally in a plane which is generally transverse to the lateral direction in which said outlet orifices are spaced apart, and the axis of a respective said absorption chamber means is generally in said plane.

11. The structure as recited in claim 10 further comprising fluid chamber means in communication with and interposed between at least each of said intersections and a respective said orifice.

12. The structure as recited in claim 11 wherein said fluid chamber means comprises a plurality of spaced apart chambers, one for each orifice.

13. The structure as recited in claim 12 wherein said fluid chamber means is communicated to a fluid supply reservoir.

14. The structure as recited in claim 7 wherein the axes of a respective said first and second inlet passage at said intersection is generally in a plane which is generally parallel to the lateral direction in which said outlet orifices are spaced apart, and the axis of a respective said absorption chamber means is generally in said plane.

15. The structure as recited in claim 8 wherein the axis of a respective said first and second inlet passage at said intersection is generally in a plane which is generally parallel to the lateral direction in which said outlet orifices are spaced apart, and the axis of a respective said absorption chamber means is generally in said plane.

16. The structure as recited in claim 15 further comprising fluid chamber means in communication with and interposed between at least each of said intersections and a respective said orifice.

17. The structure as recited in claim 16 wherein said fluid chamber means comprises a plurality of spaced apart chambers, one for each orifice.

18. The structure as recited in claim 17 wherein said fluid chamber means is communicated to a fluid supply reservoir.

* * * * *